Oct. 8, 1935.  A. LINCOLN  2,016,642
OIL, WATER AND GAS SEPARATOR
Filed Nov. 11, 1933  2 Sheets-Sheet 1

Inventor
Abe Lincoln

By A. D. Adams
Attorney

Oct. 8, 1935.  A. LINCOLN  2,016,642
OIL, WATER AND GAS SEPARATOR
Filed Nov. 11, 1933  2 Sheets-Sheet 2

Inventor
Abe Lincoln

By A. D. Adams
Attorney

Patented Oct. 8, 1935

2,016,642

UNITED STATES PATENT OFFICE 2,016,642

OIL, WATER, AND GAS SEPARATOR

Abe Lincoln, Electra, Tex.

Application November 11, 1933, Serial No. 697,661

4 Claims. (Cl. 183—2.7)

This invention relates to oil, water and gas separators and, among other objects, aims to provide an improved, composite apparatus including a novel heating unit, to effect the separation of gas, oil and water. Another aim is to provide novel means automatically to drain oil and water from the apparatus when they reach predetermined levels.

Other aims and advantages of the invention will appear in the following detailed description.

This application embodies certain improvements over Patent No. 1,835,957 issued to me December 8, 1931, and my copending application, Ser. No. 689,644, filed Sept. 15, 1933.

Figure 1:
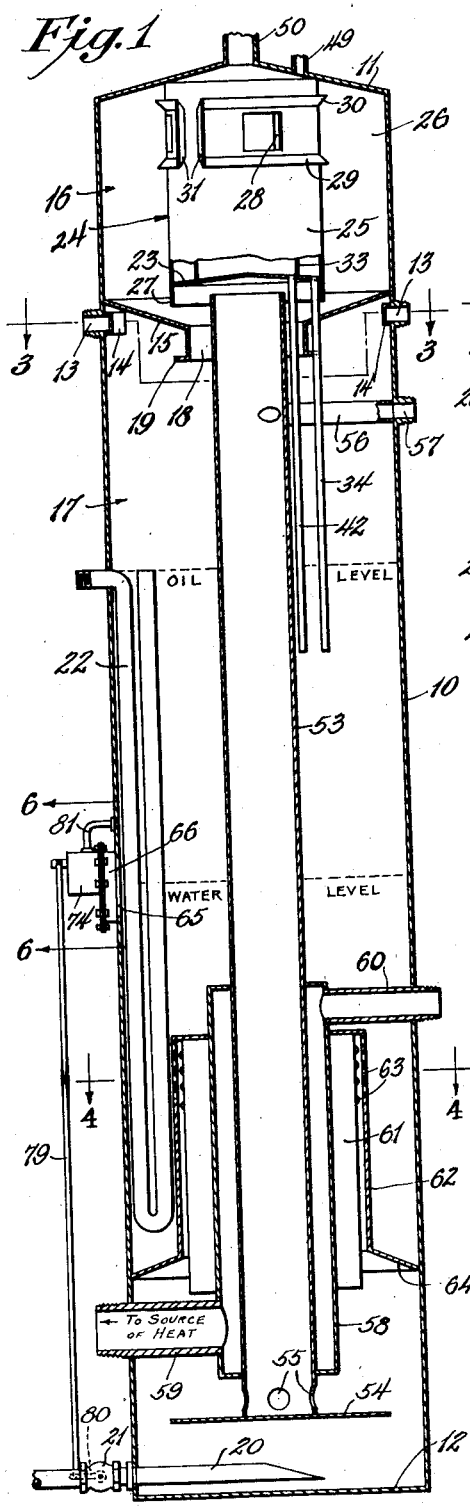
Fig. 1 is a central longitudinal section through the improved apparatus.
Figure 2:
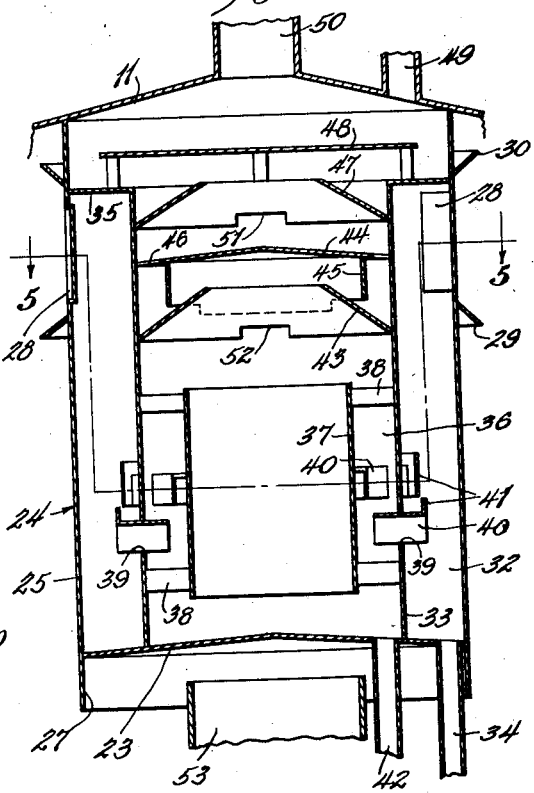
Fig. 2 is a central longitudinal section taken through a scrubbing unit forming a part of the apparatus and drawn on an enlarged scale.

Referring particularly to the drawings, there is shown an upright tank 10 having a top 11 and bottom 12. Within the tank there are provided, first, means to separate oil, gas and water when there is very little water mixed with the oil, and, second, additional means to separate the oil, gas and water when there is a large quantity of water, for example, when stripping a well. The first named means will be described first.

The tank is herein shown as being provided with one or more inlets 13 having nozzles 14 arranged to direct incoming oil substantially horizontally around the inner surface of the tank. These nozzles are located above the central portion of the tank and immediately below a cone-shaped partition 15 forming the bottom of a secondary separating chamber 16 and the top of an intermediate chamber 17. The bottom has a depending gas inlet nozzle 18 extending below the level of the nozzles 14. This nozzle has at its lower end an outwardly extending annular flange 19, the idea being to prevent oil which collects on the outside of the nozzle 18 from entering it.

The oil and gas entering the chamber 17 are directed around the inner surface of the tank and take a spiral course downwardly. The oil, being heavier, is held against the wall of the tank by centrifugal force, while the lighter gas and oil vapors are separated from the oil and collect in the central portion of the chamber 17. The gas and oil vapors being mixed with the oil on entering chamber 17 are, of course, given a definite downward movement but, after being separated from the oil, the lighter vapors and gas reverse their direction and move upwardly passing through the inlet nozzle 18. The heavy oil and water, if any, descend in the tank where the water settles out and is drained from the tank through a pipe 20 having a control valve 21. The oil rises in the tank until it reaches the top of a U-shaped oil sealed outlet pipe 22, through which it drains off automatically. This outlet pipe determines the proper oil level and its height above the bottom of the tank determines the hydrostatic pressure to be maintained. The pressure can be raised or lowered by using a longer or shorter pipe.

Thus far, the primary separation of the oil and gas has been described. The secondary separation of the oil and gas begins when the gas and oil vapor enter the nozzle 18 and strike against the conical bottom 23 of a secondary scrubbing unit 24 which is located in the chamber 16 above the partition 15. This unit is shown as including a cylindrical shell 25 which is spaced from the tank wall 10 to provide an annular channel 26. The shell is secured at its upper end to the top of the tank, thereby closing the upper end of the channel 26. The lower end of the shell extends below the bottom 23 to provide a flange or annular baffle 27 which causes the vapor, after striking the bottom 23 to move downwardly around the flange. As the vapor strikes the bottom, it precipitates some of its oil and, in reversing its direction as it passes around the flange 27, further separation of oil is effected. The separated oil drops off the flange onto the partition 15 and passes downwardly through nozzle 18 and into the chamber 17. The vapor proceeds upwardly through channel 26 and passes into the shell through deflector nozzles 28, losing more of its oil by contact with the walls of the shell and tank.

It will be noted that the nozzles 28 extend in the opposite direction to nozzles 14, thereby causing the vapor on entering the nozzles 28 to reverse its circular movement. This reversal causes the heavier entrained liquid in the vapor to be forced against the walls of the channel 26 by the momentum of the vapor and to be precipitated there.

To prevent oil which collects on the shell 25 from entering the nozzles 28, a pair of flanges 29 and 30 are provided on the shell, one above and one below the nozzle 28. The lower flange 29 extends outwardly and downwardly at an acute angle to the wall of the shell and thus prevents the precipitated oil from being forced above the flange by the gas. The upper flange 30 extends outwardly and upwardly, providing a trough which catches any oil precipitated above it on the shell. These flanges 29 and 30 do not extend entirely around the shell, being smaller in circumference than the shell so that oil in the trough 30 may run down the side of the shell. The ends of the flanges are connected together by vertical webs 31 to prevent the oil running downwardly from the trough from entering the space between the flanges.

The vapor entering the shell 25 is caused to whirl within an annular channel 32 which is formed by the shell and an inner separating cylinder 33, proceeding slowly downwardly. This action further precipitates the oil by centrifugal force on the inner surface of shell 25 where it falls to the bottom 23 and drains through a pipe 34 extending downwardly below the oil level in chamber 17. The separating cylinder is shorter than the shell 25 having the same conical bottom 23 as the shell 25 and terminating at its upper end in an annular flange 35 which is spaced below the top 11 of the tank and is secured to the wall of the shell 25 just above the nozzles 28. This flange closes the top of the channel 32 so that the vapor must move downwardly in the channel.

From near the bottom of the channel 32 the gas passes into an annular channel 36 formed by the inner surface of the cylinder 33 and the outer surface of a cylindrical deflector 37 which is open at both ends and is held suspended in the cylinder above the bottom 33 by ribs 38 connecting the cylinders 33 and 37. The gas enters this channel 36 through openings 39 and the oil is prevented from entering the openings by means of inverted U-shaped baffles 40 arranged horizontally and extending radially through the openings 39 in the wall of the cylinder. The outer ends of the baffles are spaced from the wall of the cylinder and have marginal flanges 41 to prevent oil which collects on the outer surfaces of the baffles from entering the baffles. The inner ends of the baffles are spaced from the deflector and as they are open at the bottom, the vapors are directed downwardly as well as against the outer surface of the deflector.

The vapor which moves downwardly passes around the lower edge of the deflector 37 and then upwardly through it losing more of its oil which falls to the bottom 23 and drains through a pipe 42 extending below the oil level in chamber 17. The vapor which strikes against the outer surface of the deflector loses some of its oil which escapes through pipe 42 and the vapor then rises in the channel 36. This vapor, together with the vapor rising through the inside of the deflector, proceeds upwardly through a frusto-conical nozzle 43 and, then, strikes a conical baffle 44 extending across the cylinder 33 where it is deflected and passes downwardly around the bottom of an annular flange 45 of smaller diameter than the cylinder 33 and depending from the baffle 44. The vapor then rises through openings 46 in the edge of the baffle 44, proceeding upwardly through a second frusto-conical baffle 47 near the top of the cylinder 33 and strikes a large disc baffle 48 which extends across and is spaced above the upper open end of the cylinder 33. In striking against the baffles 43, 44, 45, 47 and 48, the last particles of oil are precipitated out and the gas escapes through an outlet 50 in the top of the tank. A suitable safety valve, to relieve excess pressure in the tank, may be located in outlet 49 as shown in my prior patent. The oil which collects on the baffle 48 runs down the inside of the cylinder 33 and through openings 51 in baffle 47, openings 46 in baffle 44 and openings 52 in baffle 43 and drains from the bottom of cylinder 33 through pipe 42.

When a large quantity of water is mixed with the oil, it has been found that additional treatment should be afforded the emulsion after it enters the tank so as to separate the water from the oil. To this end, a conductor pipe or flume 53 is arranged axially in the tank, extending through the nozzle 18 from a point just below the bottom 23 to near the bottom of the tank. The upper end of the conductor is open while the lower end is closed by a relatively-large disc 54. Outlet openings 55 are provided in the wall of the conductor near the lower closed end.

The oil mixture is admitted to the conductor through a pipe 56 which extends tangentially from the conductor pipe to an inlet nipple 57 in the wall of the tank below inlets 13 (which are now closed). The oil mixture entering the stand pipe at a tangent, takes a spiral course downwardly against the inner surface of the pipe. The gas and the oil vapor are separated and occupy the central portion of the pipe; rising to the top of the pipe where they strike the bottom 23 of the scrubbing unit 24 and pass through the scrubbing cycle as before described.

The water and oil emulsion in the conductor pipe proceeds downwardly at a slow rate due to the conductor being larger than the outlet 22 and passes through the openings 55 where it is deflected horizontally by the disc 54. Assuming that the apparatus has been in operation, the oil and water levels will be subsbtantially as shown as in Fig. 1; the oil level being maintained by the pipe 22 while the water level is maintained by means to be later described. Therefore, the emulsion, on leaving the conductor, passes into salt water.

It has been found that by heating the salt water and causing the incoming emulsion to pass through it and a perforate baffle, the emulsion is broken up and the constituents more readily separate. To this end, the lower end of the conductor above the openings is enclosed in a heating chamber 58 which has an inlet 59 at its lower end extending through the wall of the tank and leads to a source of heat such as a gas flame, hot water or steam. A pipe 60 leading from the upper end of the chamber 57 through the wall of the tank provides for circulation of heating medium. To add further to the radiation of heat from the chamber, a plurality of heat transmitters, such as the radial fins 61, extend outwardly from the intermediate portion of the chamber. The chamber and fins are partially surrounded by a casing 62 which is spaced from the outer edges of the fins and has a flanged top abutting the tops of the fins and secured to the chamber. The upper portion of the casing wall is perforated as at 63 and its lower end is provided with a frusto-conical flange 64 whose marginal edge is secured to the wall of the tank. The arrangement of the casing forms an oil treating compartment in the lower portion of the tank.

The emulsion is first treated by being heated as it passes through the lower heated portion of the conductor and, after leaving the openings 55, it proceeds upwardly into the casing 62 where it contacts the outer wall of the chamber 58 and the fins 61 where the emulsion is finally broken up. On reaching the top of the casing 62, the oil and water pass through the perforations 63 where they seek their respective levels.

Figure 3:
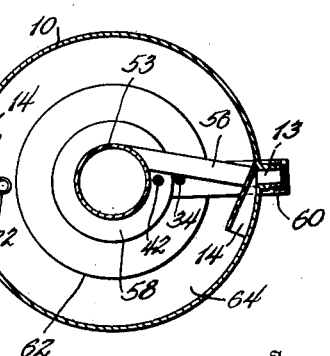
Fig. 3 is a sectional view taken on line 3—3 of Fig. 1.
Figure 4:
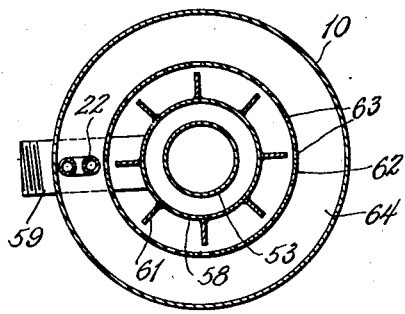
Fig. 4 is a sectional view taken on line 4—4 of Fig. 1.
Figure 5:
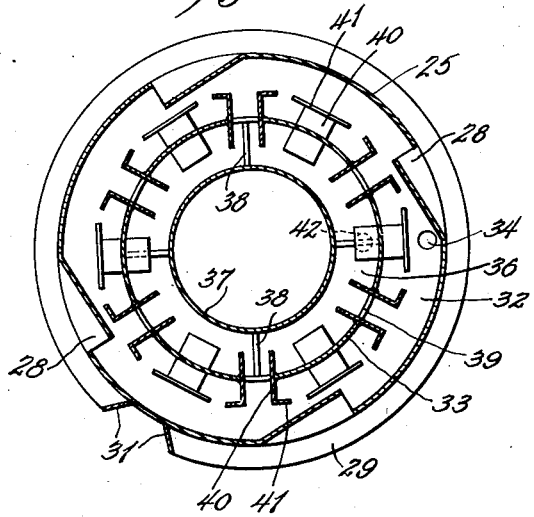
Fig. 5 is a sectional view taken on line 5—5 of Fig. 2.
Figure 6:
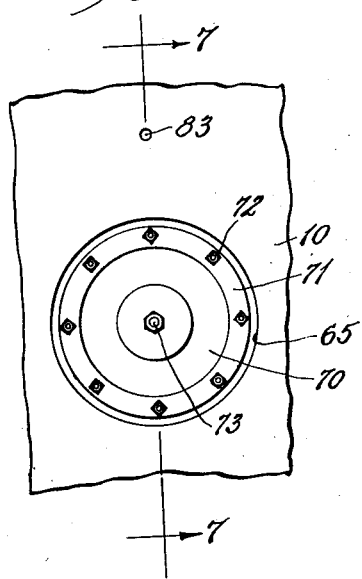
Fig. 6 is a sectional view taken on line 6—6 of Fig. 1.
Figure 7:
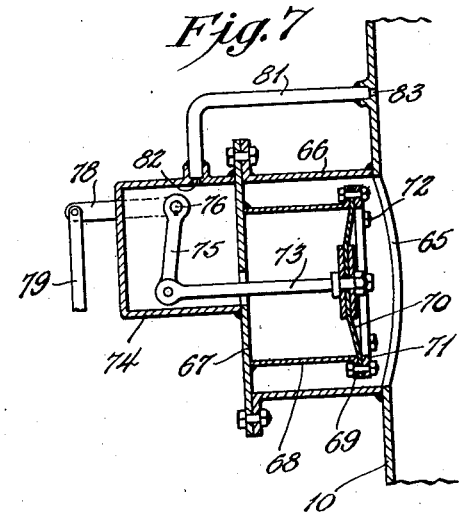
Fig. 7 is a sectional view taken on line 7—7 of Fig. 6.

To maintain the water in the tank at a predetermined level, a diaphragm control is provided for the outlet valve 21. In this instance, an opening 65 is provided in the tank wall where the water level is to be maintained and a diaphragm casing 66 is secured to the outside of the tank around the opening, see Figs. 1, 6 and 7. The outer end of the casing is flanged and closed by a removable cover plate 67 on which is secured an inwardly extending cylinder 68 having a flanged inner end 69. Closing this inner end and secured thereto is a diaphragm 70 made of rubber or corrugated metal which is held in place by a ring 71 and suitable bolts 72. Suitably secured to the center of the diaphragm is a rod 73, which projects outwardly through the opening in the plate 67 into a small housing 74 secured to the outer face of the plate 67. The outer end of the rod 73 is pivotally connected to the free end of an arm 75 which is secured at its other end on one end of a shaft 76 in the housing 74. The other end of the shaft extends through a stuffing box 77 (Fig. 3) and has a lever 78 secured thereto. A long link 79 connects the free end of the lever 78 to the control handle 80 of the valve 21. A short pipe 81 is connected to an opening 82 in the housing 74 and to another opening 83 in the tank wall above the opening 65 so that the oil in the tank above the opening 83 enters the housing 76 and casing 66 through the pipe 81 and equalizes the pressure on both sides of the diaphragm, thereby permitting the diaphragm to assume its normal position by its elasticity and close the valve 21 when the oil level is below the openings 65. If, however, the salt water rises above the opening 65, it being heavier than the oil, pushes the diaphragm outwardly against the lighter oil pressure, as shown in Fig. 7, causing the shaft 76 to rotate and raise the link 79. This opens the valve 21 and permits the salt water to drain from the bottom of the tank through pipe 20 until the water level is lowered sufficiently to permit the oil to act on both sides of the diaphragm to close the valve. Thus, the water level in the tank will be kept substantially at the opening 65.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In an oil, gas and water separator, an upright tank; a partition extending across the tank having a central depending nozzle; a gas and liquid separating unit in the tank above the partition having a gas outlet; an upright conductor pipe in the tank having an open upper end extending through the nozzle and terminating below the separating unit, said conductor pipe extending close to the bottom of the tank and having outlets at the lower end thereof; a fluid inlet extending from the tank wall and discharging tangentially into the conductor pipe near its upper end; a heating chamber surrounding the lower portion of the conductor pipe; a casing in the tank partially surrounding and spaced from the heating chamber, said casing having a perforate upper portion; an oil outlet in the tank above the heating chamber; and a water outlet at the bottom of the tank.

2. In an oil, gas and water separator; an upright tank; a partition extending across the tank having a central depending nozzle; a gas and liquid separating unit in the tank above the partition; an upright conductor pipe in the tank having an open upper end extending through the nozzle and terminating below the separating unit, said conductor pipe extending close to the bottom of the tank and having outlets at the lower end thereof; a fluid inlet extending from the tank wall and discharging tangentially into the conductor pipe; a heating chamber surrounding the lower portion of the conductor pipe; heat transmitting elements extending outwardly from the chamber; a casing extending across the tank and partially confining the heating chamber and heat transmitting elements, said casing having a perforate upper portion; an oil outlet in the tank above the heating chamber; a water outlet at the bottom of the tank; and means to maintain the water lever and the depth of the oil substantially constant in the tank above the heating chamber.

3. In an oil, water and gas separator of the class described, a tank; a gas and liquid separating unit in the upper portion of the tank having a gas outlet; a conductor pipe arranged axially in the tank and having openings at its upper and lower ends the upper end leading to said separating unit; a fluid inlet pipe connected to deliver fluid tangentially into said conductor pipe so that gas and oil vapors rise in the conductor pipe and pass through the separator unit and the oil and water emulsion descends in the conductor pipe to the bottom of the tank; an annular heater unit secured around the conductor pipe in the lower portion of the tank having radial heat transmitting elements submerged in the emulsion to separate the water from the oil; means to confine the emulsion to rise between the transmitting elements; and discharge conduits connected to maintain substantially constant oil and water levels in the tank above the heater unit.

4. In an oil, water and gas separator of the class described, a tank; a gas and liquid separating unit in the upper portion of the tank having a gas outlet; a conductor pipe arranged axially in the tank and having openings at its upper and lower ends, the upper end leading to said separating unit; a fluid inlet pipe connected to deliver fluid into said conductor pipe so that gas and oil vapors rise in the conductor pipe and pass through the separator unit and the oil and water emulsion descends in the conductor pipe to the bottom of the tank; an annular heater unit in the lower portion of the tank submerged in the emulsion to separate the water from the oil and arranged around the conductor pipe; a cylindrical casing having a flanged lower end and a perforate upper end portion confining the emulsion to circulate around the heater unit; and discharge conduits connected to maintain substantially constant oil and water levels in the tank above the heater unit.

ABE LINCOLN.